United States Patent
Sakurai et al.

(10) Patent No.: US 12,172,816 B2
(45) Date of Patent: Dec. 24, 2024

(54) PACKAGING BODY

(71) Applicant: MITSUI CHEMICALS TOHCELLO, INC., Tokyo (JP)

(72) Inventors: Masayuki Sakurai, Koga (JP); Tsutomu Kubota, Hamamatsu (JP); Hiroyuki Wakaki, Koga (JP); Tatsuya Toyama, Tokyo (JP)

(73) Assignee: MITSUI CHEMICALS TOHCELLO, INC., Tokyo (JP)

( * ) Notice: Subject to any disclaimer, the term of this patent is extended or adjusted under 35 U.S.C. 154(b) by 0 days.

(21) Appl. No.: 17/761,477

(22) PCT Filed: Sep. 16, 2020

(86) PCT No.: PCT/JP2020/035037
§ 371 (c)(1),
(2) Date: Mar. 17, 2022

(87) PCT Pub. No.: WO2021/054349
PCT Pub. Date: Mar. 25, 2021

(65) Prior Publication Data
US 2022/0348391 A1  Nov. 3, 2022

(30) Foreign Application Priority Data
Sep. 20, 2019 (JP) .................. 2019-171374

(51) Int. Cl.
*B65D 75/00* (2006.01)
*B32B 7/027* (2019.01)
(Continued)

(52) U.S. Cl.
CPC ............ *B65D 75/008* (2013.01); *B32B 7/027* (2019.01); *B32B 7/12* (2013.01); *B32B 27/08* (2013.01);
(Continued)

(58) Field of Classification Search
CPC .............. B65D 57/008; B65D 2575/30; B32B 7/027; B32B 7/12; B32B 27/08; B32B 27/32;
(Continued)

(56) References Cited

U.S. PATENT DOCUMENTS 5,635,286 A * 6/1997 Morita .................... B32B 27/32
428/35.2
5,879,813 A 3/1999 Tanaka et al.
(Continued)

FOREIGN PATENT DOCUMENTS

JP 2008155527 A 7/2008
JP 2018154133 A 10/2018
(Continued)

OTHER PUBLICATIONS

International Search Report (PCT/ISA/210) with an English translation, and Written Opinion (PCT/ISA/237) mailed on Dec. 1, 2020, by the Japan Patent Office as the International Searching Authority for International Application No. PCT/JP2020/035037. (9 pages).
(Continued)

*Primary Examiner* — Michael C Miggins
(74) *Attorney, Agent, or Firm* — BUCHANAN, INGERSOLL & ROONEY PC

(57) ABSTRACT

A packaging body configured with a packaging film, in which the outermost layer is a polyethylene-based resin layer and the polyethylene-based resin layer is uniaxially or biaxially stretched.

6 Claims, 3 Drawing Sheets

(51) Int. Cl.
*B32B 7/12* (2006.01)
*B32B 27/08* (2006.01)
*B32B 27/32* (2006.01)
*B32B 38/00* (2006.01)

(52) U.S. Cl.
CPC ...... *B32B 27/32* (2013.01); *B32B 2038/0028* (2013.01); *B32B 2250/02* (2013.01); *B32B 2250/242* (2013.01); *B32B 2307/31* (2013.01); *B32B 2553/00* (2013.01); *B65D 2575/30* (2013.01)

(58) Field of Classification Search
CPC ........ B32B 2038/0028; B32B 2250/02; B32B 2250/242; B32B 2307/31; B32B 2553/00
See application file for complete search history.

(56) References Cited

U.S. PATENT DOCUMENTS

| | | | |
|---|---|---|---|
| 2020/0061982 A1 | 2/2020 | Ambroise | |
| 2020/0369014 A1 | 11/2020 | Ambroise | |
| 2021/0023828 A1* | 1/2021 | Yamada | B65D 31/08 |
| 2022/0250363 A1 | 8/2022 | Lee et al. | |

FOREIGN PATENT DOCUMENTS

| | | |
|---|---|---|
| JP | 2018-167867 A | 11/2018 |
| JP | 2019069790 A | 5/2019 |
| JP | 2019099177 A | 6/2019 |
| JP | 2019147381 A | 9/2019 |
| TW | 357120 B | 5/1999 |
| WO | 2018/217673 A1 | 11/2018 |
| WO | 2019/156733 A1 | 8/2019 |
| WO | 2020/263887 A1 | 12/2020 |

OTHER PUBLICATIONS

Office Action (The First Office Action) issued Aug. 17, 2023, by the National Intellectual Property Administration, P. R. China in corresponding Chinese Patent Application No. 202080064876.6. (6 pages).

Extended European Search Report issued Sep. 4, 2023, by the European Patent Office in corresponding European Patent Application No. 20865105.9. (8 pages).

Office Action issued on Apr. 19, 2024 by the Taiwanese Intellectual Property Office in corresponding Taiwanese Patent Application No. 109132063 (5 pgs).

* cited by examiner

10

PACKAGING BODY

TECHNICAL FIELD

The present invention relates to a packaging body.

BACKGROUND ART

For example, packaging bags typified by pouches and the like, which are used as packaging materials for food, toiletries, pharmaceuticals, car supplies such as vehicle oils, washer fluids, and cooling water, industrial lubricating oils, heat media such as oils and water, and the like are configured with, for example, a packaging material consisting of a heat seal layer and a base material layer.

Examples of a technique relating to the packaging bag consisting of a heat seal layer and a base material layer include those described in Patent Document 1 (Japanese Unexamined Patent Publication No. 2018-154133).

Patent Document 1 describes a packaging bag formed by using a single-layer film consisting of a polyethylene-based resin composition, or a laminated film obtained by laminating a multi-layered sealant film including at least one layer consisting of the polyethylene-based resin composition, and a base film.

RELATED DOCUMENT

Patent Document

[Patent Document 1] Japanese Unexamined Patent Publication No. 2018-154133

SUMMARY OF THE INVENTION

Technical Problem

Due to growing environmental awareness in recent years, a packaging film is required to be easy to recycle.

From the viewpoint of making the packaging film easy to recycle, it is conceivable, for example, to constitute the packaging film with a single material (monomaterial) as much as possible.

According to the studies conducted by the present inventors, it was clarified that there are the following problems with a packaging body consisting of a packaging film having a polyethylene-based resin layer as a base material layer from the viewpoint of aiming at monomaterialization.

First, as shown in FIGS. 2 and 3, in a case where a packaging body 1 is manufactured using a packaging film having a polyethylene-based resin layer 4 as a base material layer, there is a step of heat-fusing parts of a heat seal layer 2 to each other. At this time, for example, at a bottom 3 of the packaging body 1, parts of the polyethylene-based resin layer 4 which is the outermost layer come into contact with each other. Further, according to the studies conducted by the present inventors, it was clarified that in the step of heat-fusing parts of the heat seal layer 2 to each other, parts of the polyethylene-based resin layer 4 which is the outermost layer are heat-fused to each other at all. In addition, it was also clarified that fusion of the polyethylene-based resin layer to a heat seal bar which is heated for heat sealing occurs.

As described above, the present inventors have found that in a packaging body having a polyethylene-based resin layer as the outermost layer, heat fusion of the outermost layer may occur at all in a process for producing the packaging body.

The present invention has been made in view of the circumstances and provides a packaging body in which heat fusion of the outermost layer is suppressed.

Solution to Problem

The present inventors have made extensive studies in order to accomplish the object. As a result, the present inventors have found that a packaging body in which heat fusion of the outermost layer is suppressed can be realized by uniaxially or biaxially stretching a polyethylene-based resin layer in a packaging body having the polyethylene-based resin layer as the outermost layer, thereby completing the present invention.

That is, according to the present invention, packaging bodies shown below are provided.

[1]
A packaging body configured with a packaging film,
in which an outermost layer is a polyethylene-based resin layer, and
the polyethylene-based resin layer is uniaxially or biaxially stretched.

[2]
The packaging body as described in [1],
in which a melting point of the polyethylene-based resin layer constituting the polyethylene-based resin layer is 100° C. or higher and 150° C. or lower.

[3]
The packaging body as described in [1] or [2],
in which the packaging body has a heat seal layer in an innermost layer.

[4]
The packaging body as described in any one of [1] to [3],
in which a heat seal layer includes a polyethylene-based resin.

[5]
The packaging body as described in [4],
in which a melting point of the polyethylene-based resin constituting the heat seal layer is 90° C. or higher and 140° C. or lower.

[6]
The packaging body as described in [5],
in which the polyethylene-based resin accounts for 90% by mass or more of the packaging body in a case where an entirety of the packaging body is taken as 100% by mass.

Advantageous Effects of Invention

According to the present invention, it is possible to provide a packaging body in which heat fusion of the outermost layer is suppressed.

DESCRIPTION OF EMBODIMENTS

Hereinafter, embodiments of the present invention will be described with reference to the drawings. Furthermore, the drawings are schematic views and do not match the actual dimensional ratios. In addition, "A to B" in the numerical range represents A or more and B or less unless otherwise specified.

<Packaging Body>

Figure 1:
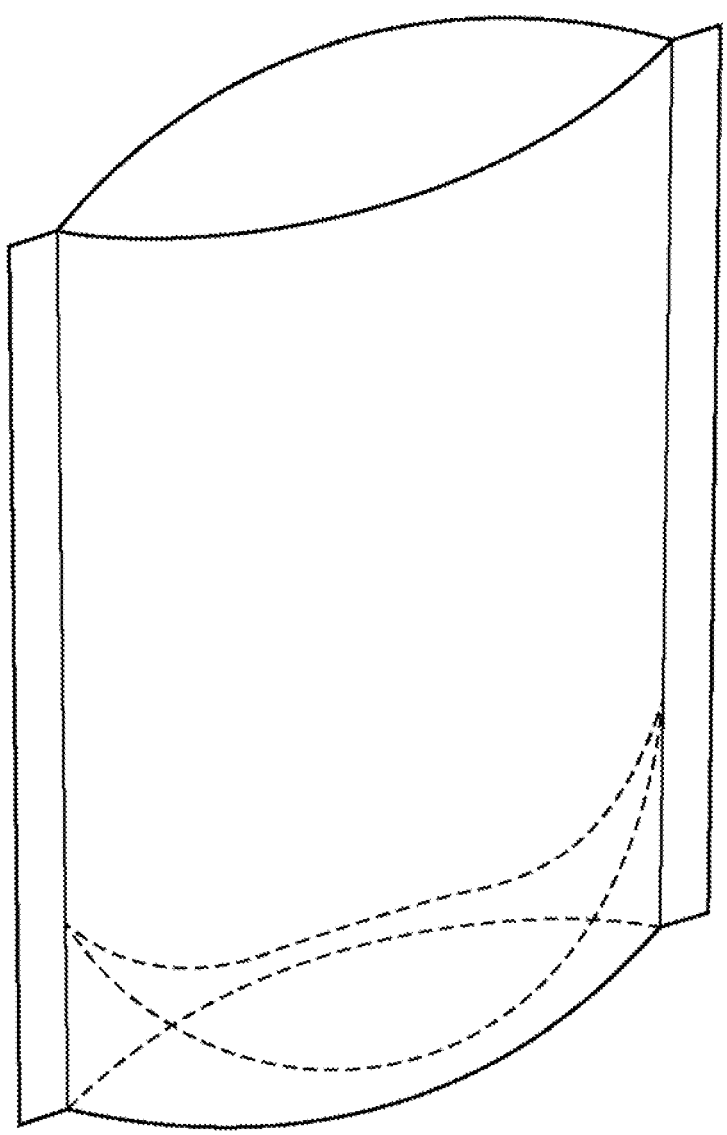
FIG. 1 is a perspective view schematically showing an example of the structure of a packaging body according to an embodiment of the present invention.
Figure 2:
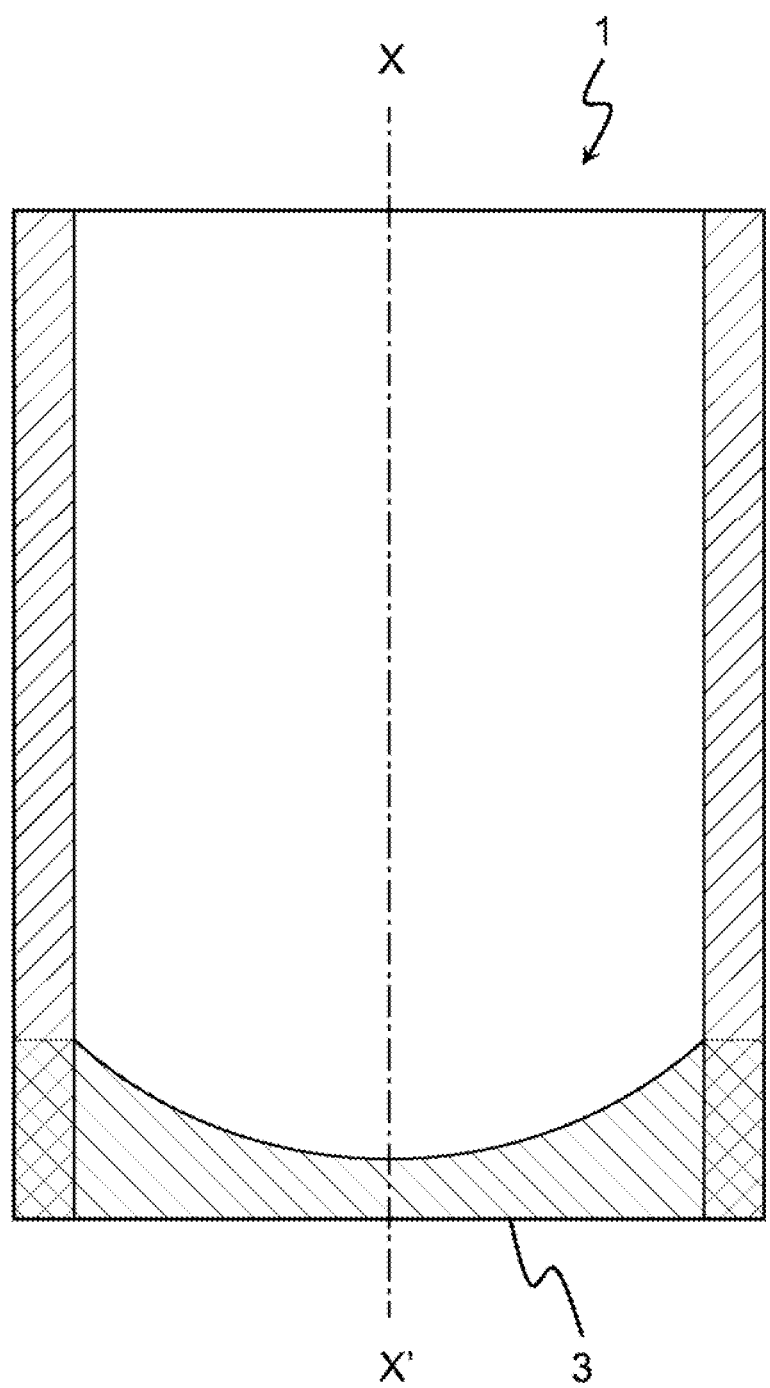
FIG. 2 is a front view schematically showing an example of the structure of a packaging body in the related art.
Figure 3:
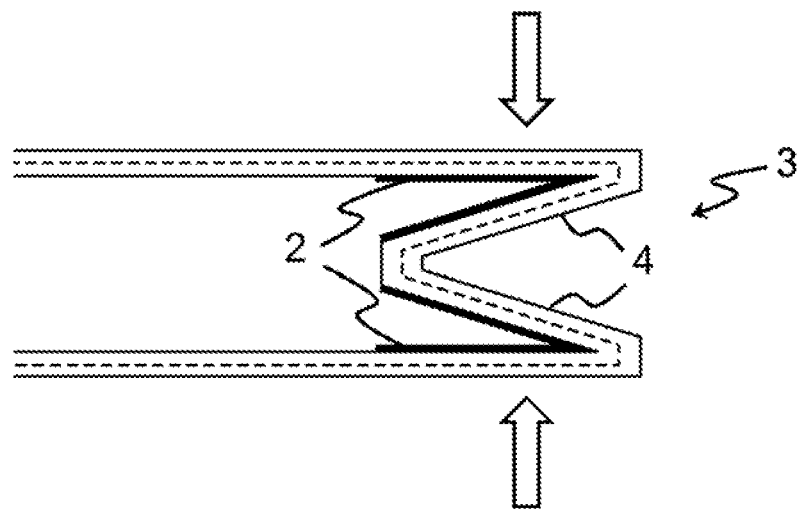
FIG. 3 is a cross-sectional view taken along a line X-X' of the packaging body shown in FIG. 2.

FIG. 1 is a perspective view schematically showing an example of the structure of the packaging body 10 according to an embodiment of the present invention.

In the present embodiment, a packaging body 10 is a packaging body configured with a packaging film, in which the outermost layer is a polyethylene-based resin layer and the polyethylene-based resin layer is uniaxially or biaxially stretched.

This makes it possible to suppress the heat fusion between parts of the polyethylene-based resin layer which is the outermost layer can be suppressed in a step of heat-fusing a heat seal layer in a packaging body in which the outermost layer is a uniaxially or biaxially stretched polyethylene-based resin layer. In addition, the polyethylene-based resin layer which is the outermost layer can be suppressed from being fused to a heat seal bar in a heat sealing step.

In the present embodiment, the packaging body is, for example, a packaging bag itself used for the purpose of accommodating articles such as foods, toiletries, pharmaceuticals, healthcare products, daily products, industrial products, car supplies such as vehicle oils, washer fluids, and cooling water, industrial lubricating oils, and heat media such as oils and water, or a packaging body having an article accommodated in the bag. In addition, examples of a packaging form of the packaging body according to the present embodiment include a three-sided bag, a four-sided bag, a pillow bag, a button-seam bag, a stick bag, a gazette bag, and a pouch, and the like, which have a heat-sealed part formed by heat fusion on a whole or a part of a peripheral edge. In addition, in addition to an article, an oxygen scavenger or the like may be put inside the packaging body.

The packaging body 10 according to the present embodiment usually has a heat seal layer in the innermost layer of the packaging body (the outermost layer on the inner side of the packaging body). This can make it possible to manufacture the packaging body 10 in the present embodiment by heat-fusing parts of the heat seal layer of the packaging film to each other.

In the packaging body 10 according to the present embodiment, the polyethylene-based resin preferably accounts for 90% by mass or more of the packaging body, the polyethylene-based resin more preferably accounts for 95% by mass or more of the packaging body, the polyethylene-based resin still more preferably accounts for 98% by mass or more of the packaging body, and the polyethylene-based resin even still more preferably accounts for 99% by mass or more of the packaging body in a case where an entirety of the packaging body is taken as 100% by mass, from the viewpoint of improving recyclability.

This makes it possible to reduce a work for separating the materials constituting the packaging body 10, and thus, the recyclability of the packaging body 10 can be improved since the packaging body is substantially configured with a single material (monomaterial).

<Packaging Film>

As the packaging film according to the present embodiment, for example, a film provided with a polyethylene-based resin layer including a polyethylene-based resin and a heat seal layer provided on at least one surface of the polyethylene-based resin layer can be used. Here, the polyethylene-based resin layer may be one layer or two or more layers.

A thickness of the packaging film according to the present embodiment can be arbitrarily set according to desired purposes such as a water vapor barrier property, cost, mechanical strength, transparency, recyclability, appearance, moldability, and light weight, and is not particularly limited thereto. The thickness is usually 10 μm or more and 220 μm or less, preferably 15 μm or more and 190 μm or less, and more preferably 20 μm or more and 175 μm or less.

In a case where the thickness of the packaging film according to the present embodiment is within the range, a balance among mechanical characteristics, handleability, appearance, moldability, light weight, and the like is more excellent.

Hereinafter, each layer constituting the packaging film according to the present embodiment will be described.

[Polyethylene-Based Resin Layer]

The polyethylene-based resin layer (also referred to as a base material layer) according to the present embodiment is formed by, for example, uniaxially stretching or biaxially stretching a film configured with a resin composition including a polyethylene-based resin.

A thickness of the polyethylene-based resin layer according to the present embodiment is not particularly limited since it can be arbitrarily set according to desired purposes such as a water vapor barrier property, cost, mechanical strength, transparency, recyclability, appearance, moldability, and light weight, but the thickness is usually 0.5 μm or more and 100 μm or less, preferably 1.0 μm or more and 75 μm or less, and more preferably 1.5 μm or more and 50 μm or less.

In a case where the thickness of the polyethylene-based resin layer is within the range, a balance among mechanical characteristics, handleability, appearance, moldability, light weight, and the like is more excellent.

The polyethylene-based resin layer according to the present embodiment only needs to include at least a uniaxially stretched or biaxially stretched outermost layer, and may be a single layer consisting of only the outermost layer or may have a configuration in which a plurality of layers configured with a resin composition including a polyethylene-based resin are laminated.

In a case of the configuration in which the plurality of layers configured with a resin composition including a polyethylene-based resin are laminated, examples of a layer other than the layer positioned on the outer surface (also referred to as the outermost layer) of the packaging body include a core layer and a laminating layer. From the viewpoint of film formability and web handling during winding, it is preferable to provide the core layer or the laminating layer. The core layer is a layer positioned between the outermost layer and the laminating layer in the polyethylene-based resin layer, and the laminating layer is a layer positioned on a surface opposite to the outermost layer in the polyethylene-based resin layer. The polyethylene-based resin layer may be configured with only the outermost layer and the laminating layer. In addition, in the polyethylene-based resin layer, at least the outermost layer is uniaxially stretched or biaxially stretched, and the core layer and the laminating layer may or may not have been subjected to a stretching treatment.

A thickness of the outermost layer is, for example, 0.05 μm or more and 10 μm or less, specifically 1.0 μm or more and 6 μm or less. A thickness of the core layer is, for example, 0.4 μm or more and 49.9 μm or less, specifically 1 μm or more and 48 μm or less. A thickness of the laminating layer is, for example, 0.05 μm or more and 10 μm or less, specifically 1.0 μm or more and 6 μm or less.

Furthermore, examples of a method of laminating a plurality of layers configured with a resin composition including a polyethylene-based resin include a dry lamination method; an extrusion lamination method; a heat fusion method of extruding a resin and laminating an extruded resin on a surface layer; and a method of using the dry lamination method, the extrusion lamination method, or the heat fusion method in combination.

(Polyethylene-Based Resin Composition)

The polyethylene-based resin composition according to the present embodiment includes a polyethylene-based resin.

A content of the polyethylene-based resin included in the polyethylene-based resin composition (that is, the polyethylene-based resin layer) according to the present embodiment is preferably 90% by mass or more and 100% by mass or less, more preferably 95% by mass or more and 100% by mass or less, still more preferably 98% by mass or more and 100% by mass or less, and particularly preferably 99% by mass or more and 100% by mass or less in a case where an entirety of the polyethylene-based resin composition is taken as 100% by mass. This makes it possible to improve a balance among a water vapor barrier property, cost, mechanical strength, transparency, recyclability, appearance, moldability, light weight, and the like.

(Polyethylene-Based Resin)

Examples of a polyethylene-based resin constituting the polyethylene-based resin layer according to the present embodiment include one or more polyethylene-based resins such as high-density polyethylene, medium-density polyethylene, low-density polyethylene, linear polyethylene, and ultra-high-molecular-weight polyethylene. Among these, one or more of high-density polyethylene, medium-density polyethylene, low-density polyethylene, and linear polyethylene are preferable, and it is more preferable that linear polyethylene alone or linear polyethylene is included in an amount of 20% by mass or more, and one or more of high-density polyethylene, medium-density polyethylene, and low-density polyethylene are included.

From the viewpoint of suppressing whitening and increasing the transparency of the packaging body, it is preferable to combine two or more of the polyethylene-based resins. The whitening is caused by crystallization of polyethylene. Since the polyethylene-based resin layer tends to be amorphous by using two or more of the polyethylene-based resins in combination, the crystallization may be suppressed and the whitening may be suppressed. From the viewpoint of the combination of two or more of the polyethylene-based resins, an MFR, a density, a melting point, and the like can be mentioned. Specifically, in a case where two or more of the polyethylene-based resins are combined, it is preferable that at least any one of the following (i) to (iii) is applicable (methods for measuring an MFR and a density will be described later).

(i) Two of the polyethylene-based resins having different MFR's of 0.5 g/10 minutes or more are used in combination. At this time, it is preferable that ratios of the two resins are the same in terms of a mass ratio or the ratio of the one with a smaller MFR is higher.

(ii) The polyethylene-based resins having different densities of 10 kg/m$^3$ or more are combined. At this time, it is preferable that ratios of the two resins are the same in terms of a mass ratio or the ratio of the one having a smaller density is higher.

(iii) The polyethylene-based resins having different melting points of 1° C. or more are combined. At this time, it is preferable that ratios of the two resins are the same in terms of mass ratio, or the ratio of the one having a lower melting point is higher.

In a case where the polyethylene-based resin layer has a multi-layer configuration as described above (for example, in a case where it has a three-layer configuration of an outermost layer, a core layer, and a laminating layer), only one layer may include two or more of the polyethylene-based resins, but each of the two or more layers may include two or more of the polyester resins. Of course, each layer in the polyethylene-based resin layer may be configured with only one polyethylene-based resin.

From the viewpoint of further improving a balance among heat resistance, transparency, mechanical characteristics, rigidity, fluidity, moldability, and the like, a melting point of the polyethylene-based resin is preferably 100° C. or higher, more preferably 120° C. or higher, and still more preferably 125° C. or higher, and is preferably 150° C. or lower, more preferably 140° C. or lower, and still more preferably 135° C. or lower.

In a case where the melting point of the polyethylene-based resin is no lower than the lower limit value, the heat fusion between parts of the polyethylene-based resin layer which is the outermost layer in the packaging body 10 can be further suppressed. In addition, in a case where the melting point of the polyethylene-based resin is no higher than the upper limit value, interlayer strength, fluidity, and moldability can be improved.

From the viewpoint of further improving a balance among heat resistance, transparency, mechanical characteristics, rigidity, fluidity, moldability, and the like, a density of the polyethylene-based resin is preferably 920 kg/m$^3$ or more, more preferably 923 kg/m$^3$ or more, and still more preferably 925 kg/m$^3$ or more, and is preferably 970 kg/m$^3$ or less, more preferably 965 kg/m$^3$ or less, still more preferably 960 kg/m$^3$ or less, and particularly preferably 950 kg/m$^3$ or less. Here, in the present embodiment, the density of the polyethylene-based resin can be measured in accordance with JIS K7112 (1999).

In a case where the density of the polyethylene-based resin is no less than the lower limit value, the heat fusion between parts of the polyethylene-based resin layer which is the outermost layer in the packaging body 10 can be further suppressed. In addition, in a case where the density of the polyethylene-based resin is no more than the upper limit value, interlayer strength, fluidity and moldability can be improved.

From the viewpoint of fluidity and moldability, a melt flow rate (MFR) of the polyethylene-based resin as measured under the conditions of 190° C. and 2.16 kg load according to ASTM D1238 is preferably 0.5 g/10 minutes or more, more preferably 1 g/10 minutes or more, and still more preferably 2 g/10 minutes or more, and from the viewpoint of further stabilizing moldability, the melt flow rate (MFR) is preferably 30 g/10 minutes or less, more preferably 20 g/10 minutes or less, and still more preferably 10 g/10 minutes or less.

A method for producing the polyethylene-based resin is not particularly limited, and the polyethylene-based resin can be produced by a known method. In addition, commercially available polyethylene may be used as the polyethylene.

(Other Components)

Various additives such as a tackifier, a heat-resistant stabilizer, a weather-resistant stabilizer, an antioxidant, an ultraviolet absorber, a lubricant, a slip agent, a nucleating agent, an antiblocking agent, an antistatic agent, an antifogging agent, a pigment, a dye, and an inorganic or organic filler may be added as necessary to the polyethylene-based resin composition according to the present embodiment as long as the object of the present embodiment is not impaired.

(Method for Preparing Polyethylene-Based Resin Composition)

The polyethylene-based resin composition according to the present embodiment can be prepared by, for example, mixing or melting/kneading the respective components by a method/device such as a dry blend, a tumbler mixer, a Banbury mixer, a single-screw extruder, a twin-screw extruder, a high-speed twin-screw extruder, and a thermal roll.

[Heat Seal Layer]

The packaging film according to the present embodiment is preferably provided with a heat seal layer on at least a part of one surface of the polyethylene-based resin layer in order to impart a heat sealing property. The heat seal layer may be provided only on a portion to be heat-fused in the packaging film according to the present embodiment, or may be provided on the entire one surface of the polyethylene-based resin layer.

In the packaging film according to the present embodiment, a thickness of the heat seal layer is preferably 0.1 µm or more and 200 µm or less, more preferably 0.2 µm or more and 170 µm or less, still more preferably 0.5 µm or more and 150 µm or less, and particularly preferably 1 µm or more and 120 µm or less.

In a case where the thickness of the heat seal layer is no less than the lower limit value, the heat sealing property of the packaging film can be improved.

In addition, in a case where the thickness of the heat seal layer is no more than the upper limit value, the fusion of the outermost layer upon heat sealing can be particularly suppressed. In general, the thicker the heat seal layer, the higher the temperature needs to be sealed.

In the packaging film according to the present embodiment, the heat seal layer provided on one surface is preferably a single layer. This makes it possible to simplify a step of producing the packaging film, that is, a step of producing the packaging body 10 according to the present embodiment.

In addition, the heat seal layer may be formed by being stretched at the same time as the film in the state before stretching of the polyethylene-based resin layer. This makes it possible to manufacture a packaging film by using a molding method such as a coextrusion molding method, that is, a laminated film manufactured by one-time molding. Thus, it is possible to simplify the step of producing the packaging film, that is, the step of producing the packaging body 10 according to the present embodiment. Therefore, the heat seal layer may be uniaxially or biaxially stretched.

(Polyolefin)

The heat seal layer according to the present embodiment is configured with, for example, a polyolefin-based resin composition including a polyolefin. Examples of the polyolefin constituting the heat seal layer include homopolymers or copolymers of α-olefins such as ethylene, propylene, butene-1, hexene-1, 4-methyl-pentene-1, and octene-1; polyethylene-based resins such as high-density polyethylene, medium-density polyethylene, low-density polyethylene, linear polyethylene, and ultra-high-molecular-weight polyethylene; polypropylene; a propylene/α-olefin random copolymer; an ethylene/vinyl acetate copolymer (EVA); and an ionomer resin.

Among these, as the polyolefin constituting the heat seal layer, the polyethylene-based resin is preferable from the viewpoint that the recyclability is improved or the viewpoint that a balance among adhesiveness with the polyethylene-based resin layer, a heat sealing property, and the like is excellent. This makes it possible to easily separate materials constituting the packaging body 10 since the packaging body is substantially configured with a single material (monomaterial), whereby the recyclability of the packaging body 10 can be improved.

(Polyethylene-Based Resin)

Examples of the polyethylene-based resin constituting the heat seal layer according to the present embodiment include high-density polyethylene, medium-density polyethylene, low-density polyethylene, linear low-density polyethylene, and ultra-high-molecular-weight polyethylene. Among these, the low-density polyethylene and the linear low-density polyethylene are preferable, and the linear low-density polyethylene is more preferable. The polyethylene may be used alone or in combination of two or more kinds thereof.

A melting point of the polyethylene-based resin is preferably in the range of 90° C. or higher, and more preferably 95° C. or higher, and is preferably 140° C. or lower, and more preferably 120° C. or lower.

In a case where the melting point of the polyethylene-based resin is no lower than the lower limit value, the stickiness on the surface of the heat seal layer can be suppressed and the blocking resistance of the packaging film can be improved.

In addition, in a case where the melting point of the polyethylene-based resin is no higher than the upper limit value, the heat sealing property of the packaging film can be further improved.

From the viewpoint of fluidity and moldability, a melt flow rate (MFR) of the polyethylene-based resin as measured under the conditions of 190° C. and 2.16 kg load according to ASTM D1238 is preferably 0.5 g/10 minutes or more, more preferably 1 g/10 minutes or more, and still more preferably 2 g/10 minutes or more, and from the viewpoint of further stabilizing moldability, the melt flow rate (MFR) is preferably 30 g/10 minutes or less, more preferably 20 g/10 minutes or less, and still more preferably 10 g/10 minutes or less.

A method for producing the polyethylene-based resin is not particularly limited, and the polyethylene-based resin can be produced by a known method. In addition, commercially available polyethylene may be used as the polyethylene.

A content of the polyolefin-based resin in the polyolefin-based resin composition according to the present embodiment (that is, in the heat seal layer) is preferably 90% by mass or more and 100% by mass or less, more preferably 95% by mass or more and 100% by mass or less, still more preferably 98% by mass or more and 100% by mass or less, and particularly preferably 99% by mass or more and 100% by mass or less in a case where an entirety of the polyolefin-based resin composition is taken as 100% by mass. This makes it possible to improve a balance among recyclability, adhesiveness to the polyethylene-based resin layer, a heat sealing property, and the like.

(Other Components)

Various additives such as a heat-resistant stabilizer, a weather-resistant stabilizer, an antioxidant, an ultraviolet absorber, a lubricant, a slip agent, a nucleating agent, a stickiness preventing agent, an antiblocking agent, an antistatic agent, an antifogging agent, a pigment, a dye, and an inorganic or organic filler may be added as necessary to the polyolefin-based resin composition constituting the heat seal layer according to the present embodiment as long as the object of the present embodiment is not impaired.

On the other hand, it is preferable that the polyolefin-based resin composition does not substantially include these various additives from the viewpoint of monomaterialization.

(Method for Preparing Polyolefin-Based Resin Composition)

The polyolefin-based resin composition according to the present embodiment can be prepared by mixing or melting/kneading the respective components by a dry blend, a tumbler mixer, a Banbury mixer, a single-screw extruder, a twin-screw extruder, a high-speed twin-screw extruder, a thermal roll, or the like.

<Method for Producing Packaging Film>

The packaging film according to the present embodiment can be obtained by, for example, uniaxially stretching or biaxially stretching a laminated film obtained by co-extrusion molding of the polyethylene-based resin composition for forming a polyethylene-based resin layer and the polyolefin-based resin composition for forming a heat seal layer into a film, using a known method for producing a stretched film.

The molding device and the molding conditions are not particularly limited, and molding device and molding conditions known in the related art can be adopted. As the molding device, a multi-layer T-die extruder, a multi-layer inflation molding machine, or the like can be used. As the conditions for biaxial stretching, for example, known conditions for producing a stretched film can be adopted.

The conditions for producing a stretched film are not particularly limited and examples thereof include the following conditions.

Extrusion set temperature: 190° C. to 250° C., processing speed: 20 to 60 m/min
Longitudinal stretching temperature: 100° C. to 130° C.
Longitudinal stretch ratio: 3.5 to 7.5 times
Transverse stretching temperature: 100° C. to 150° C.
Transverse stretching ratio: 4 to 12 times In addition, the packaging film according to the present embodiment can also be obtained by dry lamination in which the uniaxially stretched or biaxially stretched outermost layer alone, or the polyethylene-based resin layer including the outermost layer and the heat seal layer are each separately molded, and these are laminated with an adhesive or the like. Furthermore, the packaging film according to the present embodiment can also be obtained by extruding the resin of the heat seal layer onto the uniaxially stretched or biaxially stretched polyethylene-based resin layer, and performing molding by lamination molding or the like.

The embodiments of the present invention have been described above with reference to the drawings, but these are exemplary of the present invention and various configurations other than the embodiments can also be adopted.

EXAMPLES

Hereinafter, the present embodiments will be described in detail with reference to Examples and Comparative Examples. Incidentally, the present embodiments are not limited to the description of these Examples.

1. Raw Materials

The raw materials used in Examples and Comparative Examples are shown below.

(1) Polyethylene-Based Resin

PE1: Polyethylene (MFR: 0.8 g/10 minutes, density: 926 kg/m$^3$, melting point: 124° C.)

PE2: Polyethylene (MFR: 2.8 g/10 minutes, density: 942 kg/m$^3$, melting point: 129° C.)

PE3: Polyethylene (MFR: 1.8 g/10 minutes, density: 927 kg/m$^3$, melting point: 127° C.)

PE4: Polyethylene (MFR: 3.8 g/10 minutes, density: 918 kg/m$^3$, melting point: 116° C.)

PE5: Polyethylene (MFR: 1.1 g/10 minutes, density: 950 kg/m$^3$, melting point: 132° C.)

2. Measurement and Evaluation Methods (1) MFR of Polyethylene-Based Resin

The MFR was measured under the conditions of 190° C. and 2.16 kg load according to ASTM D1238.

(2) Melting Point of Polyethylene-Based Resin

The temperature of the maximum melting peak in a DSC curve of the polyethylene-based resin, obtained by using a differential scanning calorimetry (DSC), was taken as a melting point. Specifically, the temperature of the maximum melting peak of the DSC curve of the 2nd run in a case where the following 1st run and 2nd run were performed was taken as a melting point.

1st run: The temperature is elevated to 200° C. at 10° C./min, hold for 10 minutes, and lowered to −50° C. at 10° C./min 2nd run: After completion of the 1st run, the temperature is elevated to 200° C. at 10° C./min (3) Density of Polyethylene-Based Resin A density of the polyethylene-based resin was measured in accordance with JIS K 7112 (1999).

(4) Evaluation of Heat Fusion Property

A laminated film was obtained by heat-fusion of the outermost layers of two sheets of packaging films cut into a width of 15 mm under the conditions of 130° C., a pressure of 2.0 kgf, and a sealing time of 1 second. Next, the two packaging films were peeled under the conditions of a width of 15 mm, 180-degree peeling, and a peeling speed of 300 mm/min, and the peeling strength at that time was defined as a heat seal strength.

Next, the heat fusion property of the packaging film was evaluated in accordance with the following standard.

A (Very Good): The heat seal strength is less than 2.0 N/15 mm

B (Good): The heat seal strength is 2.0 N/15 mm or more and less than 5.0 N/15 mm C (Bad): The heat seal strength is 5.0 N/15 mm or more and less than 10.0 N/15 mm D (Very Bad): The heat seal strength is 10.0 N/15 mm or more (5) Presence or Absence of Whitening (Transparency)

The packaging film was visually observed. Then, the judgment was made based on the following standard.

A (Good): The packaging film is sufficiently transparent and there is no problem with the visibility of the packaging body as a packaging film.

B (Bad): With a matte tone, there is a problem with the visibility of the packaging body as a packaging film.

Examples 1 to 13

Each packaging film was manufactured by performing co-extrusion molding of each layer with a layer structure shown in Table 1 and then a stretching treatment. Then, the heat fusion property was evaluated. A molding machine used is as follows.

Multi-layer extruder: 260 mm-wide multi-layer T-die extruder (L/D=27, manufactured by Screw Seiki Corporation)

In addition, the stretch ratios were as follows.

Examples 1, 2, 4~: Biaxial Stretching 4.0 to 7.5 Times in Length and 7.5 to 14 Times in Width Example 3: Uniaxial Stretching 8 to 14 Times in Width Comparative Example 1

A packaging film was manufactured by performing co-extrusion molding of each layer with a layer structure shown in Table 1 (a stretching treatment was not performed in Comparative Example 1). Then, the heat fusion property was evaluated. A molding machine used is as follows.

Multi-layer extruder: Multi-layer T-die extruder (L/D=30)

TABLE 1

| | | | Example 1 | Example 2 | Example 3 | Example 4 | Example 5 | Example 6 | Example 7 |
|---|---|---|---|---|---|---|---|---|---|
| Polyethylene-based resin layer | Outermost layer | Type | PE1 | PE2 | PE2 | PE3 | PE5 | PE3/PE4 (50/50) | PE2/PE3 (10/90) |
| | | Thickness [μm] | 3 | 3 | 5 | 3 | 1.5 | 3 | 3 |
| | | Presence or absence of stretching | Present | Present | Present | Present | Present | Present | Present |
| | Core layer | Type | PE3 | PE3 | PE3 | PE3 | PE3 | PE3 | PE3 |
| | | Thickness [μm] | 24 | 24 | 30 | 24 | 27 | 24 | 24 |
| | Laminating layer | Type | PE3/PE4 (50/50) | PE3/PE4 (50/50) | PE2 | PE3 | PE5 | PE4 | PE2/PE3 (10/90) |
| | | Thickness [μm] | 3 | 3 | 5 | 3 | 1.5 | 3 | 3 |
| Total thickness [μm] | | | 30 | 30 | 40 | 30 | 30 | 30 | 30 |
| Evaluation of heat fusion property | | | A | A | A | B | A | B | A |
| Appearance of surface | | | A | B | A | A | B | A | A |

| | | | Example 8 | Example 9 | Example 10 | Example 11 | Example 12 | Example 13 | Comparative Example 1 |
|---|---|---|---|---|---|---|---|---|---|
| Polyethylene-based resin layer | Outermost layer | Type | PE2/PE3 (20/80) | PE2/PE3 (30/70) | PE2/PE3 (40/60) | PE2/PE3 (50/50) | PE2/PE3 (60/40) | PE2/PE3 (70/30) | PE2 |
| | | Thickness [μm] | 3 | 3 | 3 | 3 | 3 | 3 | 13 |
| | | Presence or absence of stretching | Present | Present | Present | Present | Present | Present | Absent |
| | Core layer | Type | PE3 | PE3 | PE3 | PE3 | PE3 | PE3 | PE2 |
| | | Thickness [μm] | 24 | 24 | 24 | 24 | 24 | 24 | 24 |
| | Laminating layer | Type | PE2/PE3 (20/80) | PE2/PE3 (30/70) | PE2/PE3 (40/60) | PE2/PE3 (50/50) | PE2/PE3 (60/40) | PE2/PE3 (70/30) | PE2 |
| | | Thickness [μm] | 3 | 3 | 3 | 3 | 3 | 3 | 13 |
| Total thickness [μm] | | | 30 | 30 | 30 | 30 | 30 | 30 | 50 |
| Evaluation of heat fusion property | | | A | A | A | A | A | A | D |
| Appearance of surface | | | A | A | A | A | B | B | A |

In a case of using two kinds of materials in combination, a ratio of combined use is expressed in terms of a mass ratio.

This application claims priority based on Japanese Application Japanese Patent Application No. 2019-171374 filed on Sep. 20, 2019, the disclosures of which are incorporated herein by reference in their entireties.

REFERENCE SIGNS LIST

1: packaging body
2: heat seal layer
3: bottom
4: polyethylene-based resin layer
10: packaging body

The invention claimed is:

1. A packaging body configured with a packaging film, wherein an outermost layer is a polyethylene-based resin layer,
the polyethylene-based resin layer is biaxially stretched,
wherein a thickness of the outermost layer is 0.05 μm or more and 6 μm or less, and
wherein an average density of a polyethylene-based resin constituting the polyethylene-based resin layer is 935 kg/m$^3$ or less,
wherein the polyethylene-based resin constituting the polyethylene-based resin layer comprises two or more polyethylene-based resins,
wherein the polyethylene-based resin is at least one selected from the group consisting of high-density polyethylene, medium-density polyethylene, low-density polyethylene, linear low density polyethylene, and ultra-high-molecular-weight polyethylene, and
wherein the two or more polyethylene-based resins satisfy at least one of following (i) or (iii);
(i) two of the polyethylene-based resins having different MFR's of 0.5 g/10 minutes or more, a mass ratio of a polyethylene-based resin with a smaller MFR of the two resins/a polyethylene-based resin with a larger MFR of the two resins being same or more than 1, (iii) two of the polyethylene-based resins having different melting points of 1° C. or more, a mass ratio of a polyethylene-based resin with a lower melting point of the two resins/a polyethylene-based resin with a higher melting point of the two resins being same or more than 1.

2. The packaging body according to claim 1, wherein a melting point of a polyethylene-based resin constituting the polyethylene-based resin layer is 100° C. or higher and 150° C. or lower.

3. The packaging body according to claim 1, wherein the packaging body has a heat seal layer in an innermost layer.

4. The packaging body according to claim 1, wherein a heat seal layer includes a polyethylene-based resin.

5. The packaging body according to claim 4, wherein a melting point of the polyethylene-based resin constituting the heat seal layer is 90° C. or higher and 140° C. or lower.

6. The packaging body according to claim 5, wherein the polyethylene-based resin accounts for 90% by mass or more of the packaging body in a case where an entirety of the packaging body is taken as 100% by mass.

* * * * *